Nov. 13, 1962 L. E. RAVICH 3,063,195
ARTIFICIALLY CLIMATIZED GREENHOUSE
Filed Jan. 7, 1958
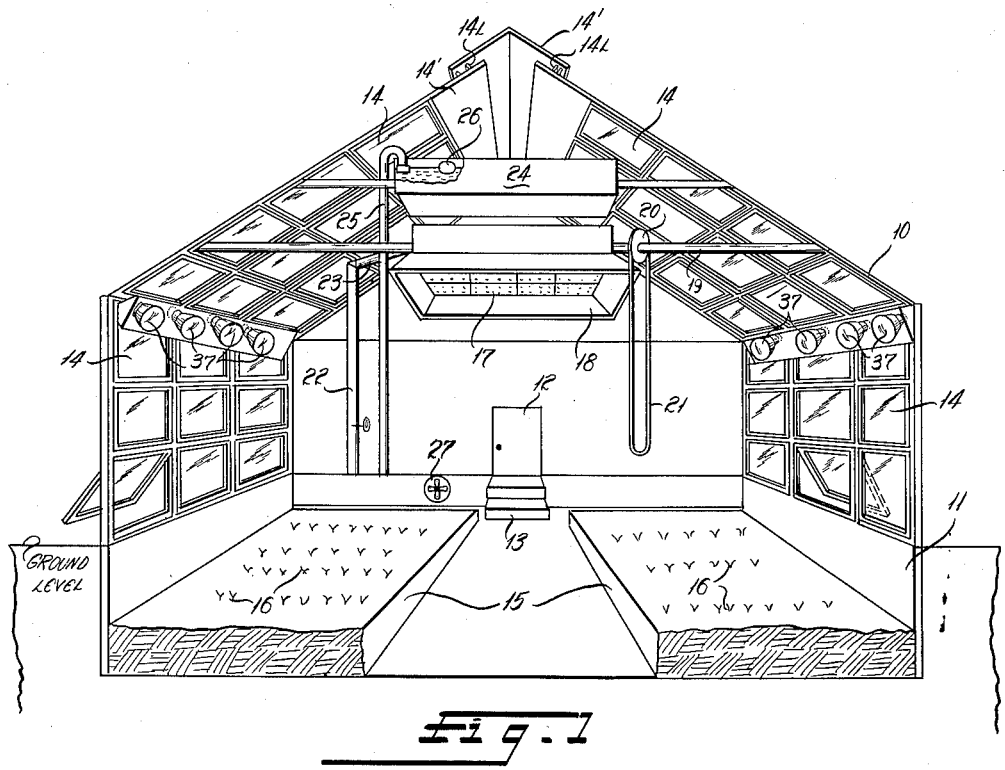
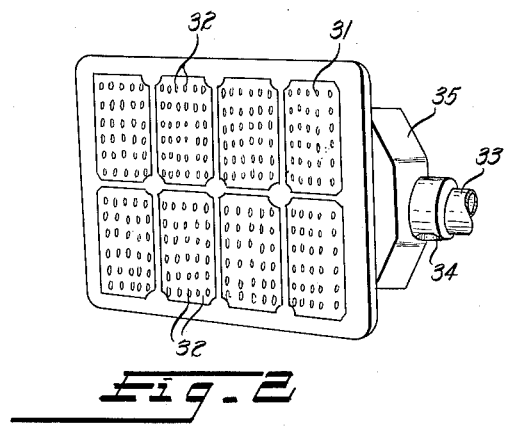
INVENTOR
LEONARD E. RAVICH
BY
ATTORNEYS

United States Patent Office 3,063,195
Patented Nov. 13, 1962

3,063,195
ARTIFICIALLY CLIMATIZED GREENHOUSE
Leonard E. Ravich, Cleveland Heights, Ohio, assignor to Hupp Corporation, Cleveland, Ohio, a corporation of Virginia
Filed Jan. 7, 1958, Ser. No. 707,629
9 Claims. (Cl. 47—17)

This invention relates to horticultural devices and more particularly to apparatus for climatizing greenhouses by gas burners that provide controlled amounts of carbon dioxide, water vapor, infrared radiation and visible radiation.

Probably more problems are encountered in greenhouse heating than in the heating of any other type of structure. These houses are usually constructed almost entirely of glass to take advantage of natural sunlight for plant growth. Glass is not a very good insulator, and consequently, greenhouse heat requirements are quite extensive. Further, the design of the greenhouse is such that it is usually a long and narrow structure which increases the problem of maintaining a uniform temperature throughout the enclosure.

Temperature influences plant growth as much as any other single factor. It is, therefore, essential to maintain optimum greenhouse temperature (for a particular crop) at all times. The varied climatic conditions throughout the seasons experienced in the United States further complicates the problem of temperature control. High humidities also are a problem, not only during the summer months, but also during the winter. Condensation in the form of water or even ice, often occurs on the under side of the glass.

It is very difficult to keep a uniform temperature throughout the greenhouse in the winter with conventional steam or hot water pipe coils. The heated pipe coils provide convection currents of warm air to carry heat to the various parts of the house. It is difficult and often impossible to maintain uniform temperatures in all portions of a greenhouse with hot water or steam pipes.

With respect to scientific horticulture and artificial control of climate in greenhouses, the essential process of photosynthesis is one to which considerable theoretical and experimental study has been devoted. For example, it is well known that necessary ingredients for plant growth include water, atmospheric carbon dioxide, visible and infrared radiation, heat and small quantities of essential minerals. Much emphasis has been placed in the past on the last two of these factors. The commercial greenhouse is primarily an effort to control temperature, and extensive progress has been made in the use of fertilizer. Experimental attempts have also been made to exert some control over the other factors. However, the procedures followed and the equipment used have been clumsy and expensive, and complete climate control has never been commercially successful.

It is therefore an object of the present invention to artificially control the simultaneous production of infrared and visible radiation, temperature, carbon dioxide and humidity within a greenhouse in the quantities required for optimum plant growth.

It is a further and more specific object to produce the optimum requirements of light, heat, carbon dioxide and water vapor for plant growth within a greenhouse by specifically controlled combustion of gas in the presence of a thermoluminescent element.

In accordance with the invention a particularly designed greenhouse structure is provided with one or more gas burners of a particular type to be described hereinafter that is capable of substantially complete combustion of natural, manufactured or liquified petroleum gas. Products of such combustion are infrared radiation, carbon dioxide, water vapor and amounts of inert gases resulting from non-combustible components or impurities in the gas. The particular design of the greenhouse structure is such that these combustion products are directed toward and otherwise retained in intimate association with the plants. In addition, the combustion surfaces of the burners are specifically treated to make them thermoluminescent, i.e., to cause the surfaces to convert a portion of the infrared radiation produced by combustion into radiation in the visible light spectrum at frequencies particularly essential for plant growth.

A particular feature of the invention resides in the means for simulating the "photoperiodism" of nature, i.e., the alternate light and dark periods of day and night, an essential element for the proper growth of plants as will be described hereinafter. This photoperiodism is produced, in accordance with the present invention, by the novel means of periodically directing the direct radiation of the burner toward a novel waterload which is thereby converted into essential water vapor. At the same time the burner continues the production of carbon dioxide and combustion produced water vapor, each being further essential for proper plant growth.

There are times when direct infrared impingement on the plants is not desirable and it is during this period that the burner is directed toward the waterload. If no $CO_2$ is desired during this period, the burner may be turned off or it may be continued in operation for additional $CO_2$, and water vapor generated from the waterload, which serves as a means for dissipating the heat energy generated by the burner.

These and other objects and features of the invention, its nature and its advantages, will appear more fully upon consideration of the following detailed description taken in connection with the illustrative drawing in which:

FIGURE 1 is a diagrammatic perspective view of a greenhouse enclosure showing the nature and location of the climatizing gas burner and its humidity producing waterload; and FIGURE 2 is a perspective view showing in more detail the climatizing gas burner of FIGURE 1.

It is of course beyond the scope of the present disclosure to provide a complete treatise of botany or a complete analysis of the process of photosynthesis. However, a few principles must be reviewed for a complete understanding of the invention.

First, the importance of carbon dioxide to plant growth must be emphasized. Atmospheric air contains approximately .03% by volume of carbon dioxide. Compared with this small amount, 40% to 45% of the dry weight of vegetable matter is the element carbon. It is obvious that an enormous volume of air must be depleted of carbon dioxide to supply the necessary carbon for a crop. The rate at which carbon dioxide can be delivered to the plants and absorbed by them is therefore a predominantly limiting factor upon their rate of growth under natural circumstances. However, it has been recognized that plants can effectively utilize carbon dioxide in much greater concentration than is provided by nature. Too great a concentration produces a toxic reaction in the plant, but below this value is a concentration range from 10 to 100 times that of the atmosphere for which substantially increased dry weight yields will be produced.

The nature of the light supplied to the plant is also important. While the intensity of natural light on a clear day is usually in excess of that necessary for plant growth, much can be done by artificially increasing the length of exposure or the length of the day. In general, it may be stated that the production of dry matter by plants is roughly proportional to the length of exposure to light up to the point where factors dependent upon photoperiodism diminish the effect. One of the diminishing factors, termed "solarization," refers to a decrease or complete disappearance of starch from the leaves of the plant following a long exposure to light and a consequent loss of the photosynthetic power of the leaves. Solarization has no permanent effect upon the activities of the leaves, however, since after a period of darkness the leaves regain their original photosynthetic power. Another factor concerns the growth sequence in certain plants in which food is accumulated during the day while elongation takes place principally at night. Finally, many species depend on a changing length of day to bring them into maturity. For example, species maturing in the spring are called "long-day" plants which will mature only under the influence of an increasing day. Fall maturing varieties, called "short-day" plants, are matured by the action of short days. Optimum growing conditions are a balance between the need for photoperiodism on one hand and maximum exposure on the other for a specific variety and cannot be categorized too specifically. In general, however, favorable results are obtained by increasing the natural day to a period up to 18 to 20 hours with an average intensity over this period in the order of at least 10-foot candles. The entire visible spectrum from approximately 4,000 to 6,000 angstroms, with the possible exception of green band, is important in one way or another for proper growth. Direct infrared radiation is also important but the value of ultraviolet radiation appears to be minor.

The factor of humidity is also important. Even though optimum light and carbon dioxide is available, the processes of photosynthesis do not continue unless the stomata (the leaf openings through which the interchange of gas between the interior of the leaf and the atmosphere takes place) are open. If the atmosphere humidity surrounding a leaf drops too low, even though soil moisture is high, the stomata will close to prevent excessive transpiration of the water vapor. The same effect can also occur, of course, during periods of excessive temperature. Up to this point, however, the rate of photosynthesis is increased by increase in temperature just as any other chemical reaction is increased provided that no other parameter is a limiting factor. Again the various requirements of the species vary, but on the broad average a growing temperature in the vicinity of 20° C. to 40° C. is satisfactory. This temperature should be maintained both in the atmosphere surrounding the leaves and in the soil supporting the roots of the plants. In certain varieties a periodic change of the soil temperature is desirable to cause seed germination.

Referring now to FIGURE 1, a greenhouse is shown as an illustrative embodiment of the present invention in which all factors discussed above are simultaneously controlled by artificial means. The greenhouse comprises an enclosure 10 of any suitable construction having as its principal requirement in accordance with the invention, that the lower regions thereof be designed for holding the heavier than air aeroform products such as carbon dioxide and water vapor components of the growing atmosphere around about the leaves of the growing plants. To this end, one embodiment of the invention as illustrated in the drawing contemplates that the structure 10 be erected over an excavation 11 in the ground. The depth of excavation 11 should at least exceed the height of the tallest plant to be grown. Thus the excavation 11 serves as a large, substantially impermeable, damp receptacle for the growth stimulating atmosphere. Access into structure 10 is provided through a door 12 at ground level and steps 13 descending into excavation 11. Thus entrance is obtained without excessive loss of the growing climate. The roof and upper walls of structure 10 may include typical glass panels 14 found in conventional greenhouses in order that natural light and heat may supplement that produced artificially.

An ideal material for use in the construction of suitable greenhouses is a clear plastic made for example from polyacrylic resin so that it does not deteriorate when exposed to direct sunlight over long periods of time. Plastic panels may be used in four foot widths to permit modular greenhouse construction. The entire greenhouse may be a very simple construction consisting essentially of prefabricated units easily assembled and disassembled to produce greenhouses of substantially any desired dimension. The ridge portion at the top of the greenhouse should be formed of metal, or other suitable material as indicated at 14', to permit the venting of the undesirable combustion products from the gas burner units or steam from the waterload to be described hereinafter which might be hot enough to adversely affect the plastic panels.

Supported from the floor within structure 10 are low lying soil trays or beds 15 in or on which plants 16 are grown. Obviously the floor itself may constitute the soil in which the plants are grown. In accordance with one feature of the invention, the soil in beds 15 is artificially darkened by mixing coal dust or other dark inert coloring matter with the soil. With most soils this not only improves the consistency of the soil, but also substantially increases its absorption of infrared radiation with resulting increase in soil temperature.

The ventilation pattern in a preferred greenhouse should be arranged to eliminate excessive condensation therein and, if desired, to accelerate bringing the $CO_2$ into the area of the plants to promote growth. The use of side vents above the plants by pivoting a desired number of the lower panels 14 outwardly as shown in FIGURE 1 together with a top roof vent having adjustable open and closable louvers 14L (air entering the former and discharged through the latter) is one of the preferred ventilation methods. To eliminate the need for blowers, the total area of the side vents should be about 1½ times the area of the roof vents. If desired, the flow pattern may be reversed by employing a small exhaust fan 27 at the greenhouse floor level to bring the $CO_2$ down over the plants.

Supplementary carbon dioxide may be obtained if desired by evaporating Dry Ice ($CO_2$) in proper proportions in the immediate area, emitting gaseous $CO_2$ in the immediate area as for example by reacting hydrochloric acid (HCl) and marble chips; however the Schwank burners referred to hereinafter provide sufficient $CO_2$ for normal operations, but during summer months it may be desirable to provide the $CO_2$ as above described.

Suspended above so as to uniformly illuminate beds 15 are one or more gas burners such as indicated at 17 having a reflector 18 adapted to produce a floodlamp type distribution of its radiated energy. Preferably, burner 17 comprises a plurality of gas burners of the particular type described and claimed in U.S. Patent No. 2,775,294 of Guenther Schwank. Further details of this burner are shown in FIGURE 2.

The unusual characteristics of the Schwank burner include its ability to completely burn natural, manufactured or liquified petroleum gas at low pressures. Under optimum conditions, 15% of the gas burned should be converted to carbon dioxide which will serve as an excellent aerial fertilizer. Substantially perfect combustion is essential to successful practice of the present invention since carbon monoxide produced by imperfect combustion is highly toxic to plant life.

Burner 17 is supported on a rotatable shaft 19 extending across structure 10 in a manner making it possible to rotate burner 17 at least 180° about the axis of shaft 19 from a position directed downward upon plants 16 to a position directed upward. As illustrated, one possible method for producing this rotation is by sprocket 20 over which a hand-operated chain 21 may pass. The gas supply for burner 17 is delivered through pipe 22 and a flexible connecting pipe 23 having suitable connecting couplings (not shown). The reasons for the rotatability of burner 17 will be discussed hereinafter.

In preferred embodiments of the invention, there is provided directly above burner 17 a suitably supported tank 24 which is open at the top and is filled with several inches of water, the level of which is maintained through pipe 25 and controlled by a suitable float valve 26. The bottom of tank 24 is preferably blackened to increase its radiant energy absorbing properties.

Referring to FIGURE 2 there is illustrated a Schwank burner comprising a low heat conductivity refractory tile or ceramic plate 31 which is perforated by a large number of fine holes 32. Gas is delivered through pipe 33 and air is drawn in through orifice 34. Premixing takes place in an air box 35 where sufficient turbulence is produced to drive the mixture through holes 32. When the gas is lighted it burns with an evenly distributed mat of flame typical of surface combustion. The thermal conductivity of refractory 31 is so low that the inside surface is never heated to the ignition temperature of the gas. For a more detailed description and illustration of the Schwank burner, reference should be had to U.S. Patent No. 2,775,294.

In accordance with this invention, the outer surface of refractory 31 as it is commercially available is preferably modified by coating it with a suitable thermoluminescent material to product an emission in the visible spectrum of from 4,000 to 6,000 angstroms in frequency and an intensity at plants 16 of 1,000-foot candles for photosynthesis. For this purpose, a coating of platinum, cerium, strontium or thorium compounds, either salts or oxides or both, will prove satisfactory. Since the porosity of refractory 31 is so great, the thermoluminescent coating may substantially impregnate beyond the surface thereof without interfering in any way with the combustion properties of the burner.

A metal screen, for example 10 by 10 mesh Nichrome wire, spaced in front of the refractory plate 31 a distance of from 1/8" to 5/8" will enhance the infrared emission by raising the surface temperature of the plate 31 without increasing the gas consumption of the burner.

The method of practicing the invention with the apparatus thus far described may now be described in detail. Seedling or starting plants 16 are arranged in accordance with usual greenhouse practice in properly fertilized and watered beds 15. Burner 17 is lighted. It immediately begins to produce the combustion products of carbon dioxide and water vapor. Since no draft producing vent is directly associated with the burner to carry these products away, as would be the case in conventional use of a gas burner used simply for heating purposes, these heavier than air components settle to the bottom of structure 10 where they are retained in a concentrated layer constituting the growing atmosphere over and around plants 16. In accordance with the invention, it is contemplated that the size and number of burners 17 employed be sufficient for a given size greenhouse to raise the concentration of carbon dioxide in the growing atmosphere to at least .3% by volume and preferably greater. It is doubtful that the carbon dioxide concentration found to be toxic to the plants can ever be reached. Similarly the combustion produced water vapor raises the humidity in this layer.

At the same time burner 17 produces infrared radiant energy. A large portion of this is absorbed by the growing layer, and a portion is directly utilized by the plant. The remainder is absorbed by the artificially darkened soil to raise the soil temperature and the temperature of the growing atmosphere layer. In accordance with the invention it is contemplated that the soil absorption of radiant energy be sufficient to raise and maintain the temperature of the soil and the growing layer to the range of from 20° C. to 40° C. Outside temperatures and the amount of natural radiation received are, of course, factors that must be accounted for. Since both the water vapor and the carbon dioxide components of the growing atmosphere are large absorbers of infrared, it is important that the quantity of infrared produced by burner 17 be larger than might be expected and substantially larger than that radiation naturally produced or produced by conventional electrical infrared lamps. The gas burner of the type described is particularly suited in this aspect to the present invention because it produces a large component at the larger wave lengths of the infrared range where absorption by carbon dioxide and water vapor is a minimum.

It has been found that the use of infrared gas burners as specified herein eliminated "greenhouse pattern" which is usually present in all greenhouses and which is caused by proximity of plants to the pipes or the presence of shadow forming objects between the pipes and plants. In practicing this invention, a uniform growth pattern is obtained despite the fact that the intensity of the radiation to which the plants are exposed may vary substantially because of "shadowing" by opaque objects.

Part of the infrared radiation produced by burner 17 is converted into visible light by the thermoluminescent coating thereon. This light, together with natural light received through panels 14 and supplemented if necessary by suitable electrically produced artificial light from high intensity "mushroom" shaped lamps 37, capable of providing a concentrated intensity on a small area, is directed toward plants 16. The invention contemplates that the intensity of the total light should be at least 1,000-foot candles at plants 16 for a period of at least 12 hours, but less than 20 hours if photosynthesis is desired. Long and short day plants may be forced into earlier maturity by gradually shortening or lengthening this period in accordance with the species of the plant being forced.

The burner described in the Schwank Patent No. 2,775,294 is particularly effective since it is capable of supplying heat where needed, that is, to the soil and to the plants and eliminating the necessity for heating a large body of air. The heated soil also acts as a buffer to reduce the possibility of sharp temperature changes in the area where they are likely to be harmful. Other controls responsive to plant and soil temperature together with dew-point controls may be provided.

Supplemental radiation in the visible spectrum can be supplied by lamps 37, for example, mercury vapor lamps in units sufficient to irradiate the area to be treated. An example of a suitable mercury vapor lamp is Model No. SH12 manufactured by Sylvania Electric Products, Co. High intensity lamps are preferred because the number of low intensity lamps that would be required for the desired amount of radiation would block out desirable sun light.

It is of course well known that, in general, long days increase the rate and duration of vegetative elongation of plants whereas short days decrease the rate of growth and hasten the onset of bud formation. This long day can be simulated in a greenhouse of this invention by supplementing the radiation from the gas burners 17 with efficient high intensity lamps such as for example the above-described Sylvania mercury vapor lamp which is obtainable at either 400, 700 or 1,000 watt ratings, and is interchangeable with all other mercury vapor lamps of the same wattage. The difference between the Sylvania lamp and other lamps on the market is that Sylvania unit has a special phosphor and coating added to the inside surface of the lamp to convert the basic blue-green usually associated with a mercury vapor lamp to a radiant output very close to normal sunshine. The lamp has a surprisingly high efficiency, and is ideal for greenhouse heating in conjunction with the Schwank gas burner described hereinbefore which provides the infrared and far-red radiation (near 7,350 angstroms) not emitted by the Sylvania lamp. Another suitable mercury vapor lamp is the General Electric Company Model No. 400-HI which is 400 watts.

In order to prevent solarization and to allow for darkness elongation to take place and otherwise to simulate the photoperiodism of nature, at the end of the prescribed period, burner 17 is rotated by manipulation of chain 21 into its upward position and other artificial light is extinguished. During this period the production of heat, carbon dioxide and water vapor continues. The radiation produced by burner 17 during this period is however absorbed in the blackened surface of tank 24 and the water therein is boiled and evaporated. The low temperature, low pressure steam produced thereby settles into the climatized layer in excavation 11 to add further to the humidity of this layer. While the steam will maintain the climatized layer temperature above a minimum level in the absence of direct infrared radiation, the temperature will drop enough to produce a desirable temperature periodicity for plant growth. Excessive humidity can present a problem with respect to fungus growth upon the leaves of the plant but ordinarily excessive moisture will condense and be added to the soil moisture before this condition is reached. It is more important that there be a continuous supply of water vapor to the air.

While an attempt has been made to specifiy the optimum ranges of intensity, periods and concentrations of the various parameters affecting growth, it must be understood that the combination of these factors most suitable for a given species varies greatly from one variety of vegetation to another. The invention contemplates therefore that once an optimum value of all parameters for the particular species of interest has been determined by empirical methods, they may be automatically maintained by the apparatus described. In this connection, the invention contemplates that suitable automatic controls can be set up to control for example, the humidity and temperature by regulating the flow of gas to the burner and by regulating ancillary ventilation into structure 10 from the outside.

The following examples are illustrative of a number of ways the greenhouse assembly and methods of the invention may be used in controlling the growth of various plants:

*Example I.—Photoreversibility of Flower Initiation*

Spcetrum studies have shown that such diverse light controlled plant responses as flower initiation, internode elongation, leaf expansion, and seed germination are regulated most effectively by red radiation near 6,500 angstroms. It has been recently demonstrated at the U.S. Department of Agriculture that the red reaction inducing the germination of light sensitive lettuce seed could be reversed. Studies have shown that far-red (near 7,350 angstrom) is the region of maximum effectiveness in reversing the red reaction and thereby inhibiting seed germination. Thus, seeds irradiated with red are put into a germinating condition that is nullified or reversed if a far-red irradiation immediately follows the red. This duo-directional reaction was shown to be repeatedly reversible and to be independent of temperature. The same reversible photoreaction was also established for the control of flower initiation of xanthium, cuticle coloration of tomato fruits, and photomorphogenic effects such as leaf expansion, hypocotyl elongation and the disappearance of a plumular hook of dark-grown beans.

It was further determined that a mixture of far-red and near infrared had no effect on seed germination. The Schwank gas burners described hereinbefore emit large amounts "far red" and "near infrared" energy. Inasmuch as they are emitted simultaneously, they would have no effect on seed germination, but initiation, etc. However, the infrared radiation can be eliminated from the radiation emitted from the gas burner by means of filters. The "far red" radiation remaining could then be used to initiate growth changes in the plant.

*Example II.—Photoperiodic Responses of Plants and Animals*

Interruption of the dark period of a twenty-four hour cycle with visible radiation has been found to control reproduction in representatives of the Spermatophyta, Chordata, Arthropoda and Mollusca. Elongation, possibly cell division, in certain seedling structures is controlled by the same photoreaction as that for the photoperiodic control or reproduction in plants.

By the use of proper filters on the Schwank gas burners described hereinbefore, the wave lengths most useful in controlling cell reproduction can be projected on to the area to be treated without the interfering near or far infrared energy. In addition, the surface of the refractory plate 31 can be coated with selected materials to increase the emission in the desired wave length range. Such materials are, for example, strontium, thorium and cerium salts.

*Example III.—Plant Elongation With Infrared Exposure*

Internode elongation of the bush Pinto bean is an example of the effects of infrared and red radiation on plant growth. If these beans are grown with daily light periods of several hours under light sources such as "white" fluorescent lamps having low intensities in regions below 7,000 angstroms, the developing internodes are short. But if they are exposed after the end of each light period on four successive days to moderate energies, which can be delivered in fifteen minutes or less, in the region beyond 7,000 angstroms the internodes increase in length several fold; essentially the beans are changed from "bush" to "pole" at this stage of growth. If the plants are irradiated with red light following exposure to high energy in the far-red region of the spectrum at the end of the light period, the lengthening stimulus of the far-red is nullified. The internodes may attain lengths depending on the red energies, no greater than those of controlled plants. This is the reversal. Essentially the length of the second internode of the bean is a function of the fraction of the pigment converted by radiation, and it can be used as an index of the conversion irrespective of the nature of the function. The near and far-red range and near infrared portion of the spectrum have substantial effects on seed germination. After red irradiation, some seeds germinate upon being held in darkness at a favorable temperature, others remain dormant. At a slightly higher red energy the germination requirements of these same seeds and those of an increment are met. The seeds of this increment are different from all others in that their energy requirements for germination are greater than the first energy given but less than the second.

The U. S. Department of Agriculture has measured the germination responses of lettuce, *Lactuca sativa,* and of pepper grass to an increasing series of red and far-red energies. The values of absorption coefficients of the two pigments in the region between 4,000 and 5,200 angstroms are of the order of 0.01 times those at the action maximal in the red and far-red portions of the spectrum. It has been theorized that the photochemical reaction probably involves the radiationless transition of the molecule from an excited singlet- to a triplet-state. The triplet-state probably accepts hydrogen from the reactant in one form and donates hydrogen to the oxidized reactant in the other form. Variations in quantum efficiency arise from the variations in the ratio of the oxidized and reduced forms of the reactant in the biological object depending upon ambient condition.

Variations of physiological response with a fraction of pigment conversion as obtained from the reversibility and the first order character of the conversion with respect to energy in the controlling reversible photoreaction were measured for internode lengthening and seed germination. Knowledge of this fraction at the U.S. Department of Agriculture, Beltsville, Maryland permitted calculation of absorption coefficients and quantum efficiencies for pigment conversion. The method is a general one, possibly applicable to photoperiodism and other responses controlled by the reversible photoreaction.

The present method of obtaining the proper spectral range of red light is to use standard incandescent flood lamps with red filters. Although the filters appear to transmit only red radiation, it has been impossible to prepare filters that would not transmit a small amount of blue and yellow radiation which would have detrimental effects on the photoreactions. The Schwank gas burners described hereinbefore can be so adjusted as to emit only in the near-red, far-red and infrared portions of the spectrum with no blue light present and very little yellow light. Even this yellow light can be controlled by proper gas pressures and proper adjustment of combustion relations. In addition, filters can be placed in front of the Schwank units to further control the emission.

*Example IV.—Action of Light on Lettuce Seed Germination*

Effectiveness of radiation in various regions of the spectrum to stimulate or to inhibit germination of *Lactuca sativa* seed has been measured by researchers and it was found that a wave length region extending from 5,800 to 7,000 angstroms was the most effective for promotion of germination, while radiation between 7,000 and 8,000 angstroms as well as below 5,000 angstroms was inhibitory.

Further studies of light action on lettuce seed germination and reported by the U.S. Department of Agriculture led to the discoveries that (a) two pigments are involved, (b) these pigments can be very rapidly interconverted by radiation, (c) the pigment absorbing with a maximum near 7,350 angstroms changes slowly in darkness to the other, with a maximum near 6,600 angstroms, (d) the pigments controlling lettuce seed germination also control photoperiodic response of cocklebur, and (e) the time measuring reaction of photoperiodism by which the length of night controls flowering is a dark conversion of the pigment from one form to the other. The following was reported: (1) the action spectra for promotion and inhibition were measured in detail for wave lengths greater than 4,000 angstroms. Maximum sensitivity for promotion was found in the region 6,400–6,700 angstroms (red) and for inhibition in the region 7,200–7,500 angstroms (infrared), (2) absorption of radiation in the red or in the infrared region changes the effective pigment into the infrared or the red absorbing form, respectively. The alternation of form can be repeated many times. (3) The action spectrum for lettuce seed germination is the same as that effective for photoperiodic control of floral initiation. The two phenomena involve the same initial photoreaction. (4) The photoreaction involves minor molecular isomerization of the effective pigment, and (5) a reaction by which the pigment changes from the infrared to the red absorbing form occurs in darkness. The reaction was elsewhere found to be one by which duration of darkness is measured in photoperiodic control of floral initiation.

The emission from the Schwank gas burned described hereinbefore can be controlled by means of suitable surface coatings or filter to thus promote or inhibit seed germination. If the gas burner emission is not controlled in any manner and both "near and far red" and "near and far infrared" radiation are emitted simultaneously, no specific action on seed germination should occur. The gas burner will then function essentially as an infrared source to provide a means of heating.

*Example V.—Plant Response Controlled by Red and Infrared Radiation*

Recent research has shown that flowering can be prevented by exposing a long-night plant to ordinary white light during the middle of the dark period. White light, of course, is a mixture of all the colors of the spectrum. It was then observed that red light was the effective band in the narrow wave length bands and this was determined by studying the reaction of plants to separate wave lengths.

So effective was red light that using it on "long-night" soy beans for less than half a minute in the middle of the fourteen-hour dark period was enough to prevent flowering. Red light also proved to be the most effective band in causing the flowering of "short-night" plants when applied near the middle of the dark period. It was then shown that both groups of plants had the same photoperiodic mechanism. The mechanism appears to work through the leaves of the plants. It has recently been determined that although the chemical structure of the special substance in the leaves which causes these effects is not known, it is certainly a pigment.

It was also found that red light regulates still another group of plant responses. Although they are not affected by night length as are flowering, bulbing and runner production, the new responses do react to red light in just the same way. Such a response allows corn seedlings to put out permanent roots at the proper time. Similarly, small amounts of red light can regulate the stem and leaf growth of pea seedlings otherwise grown in the dark. The latest finding and one of the most interesting is a reversible photoreaction that controls lettuce seed germination. This discovery was made by H. A. Borthwick and his group at the Bureau of Plant Industry, Soils and Agricultural Engineering. This group decided to look into published reports that the germination of one variety of lettuce seed was promoted by exposure to red light but held back by infrared radiation. The response to red light suggested a relation to photoperiodism and that is exactly what it turned out to be. Red light caused the lettuce seed to germinate and it would soon sprout if no further treatment were given. Infrared rays, on the other hand, put the plant back to sleep. It failed to sprout when infrared was used on the seed soon after exposure to red. The response could be pushed either way by changing the light. It then appeared that more than one pigment was involved.

Further research indicated that the red radiation was the most effective part of the spectrum not only for control of flowering but also for promotion of lettuce seed germination. The tests indicated that infrared held back germination but it was never recognized as effective in control of flowering and the scientists then realized that they had missed something in their research.

In retests with the cocklebur, the scientists used enough red light in the middle of the dark period to prevent flowering—then followed up at once with infrared. The cocklebur bloomed, indicating that infrared rays had undone the effect of the red radiation. The infrared then, has the same effect as a long dark period. It was now apparent that the reversible reversible reaction observed in seed germination also works in the regulation of flowering.

The use of photoperiodism can be of help both in the field and the greenhouse. For example, wheat breeders discovered that the breeding of new wheat varieties must be carried through several generations to get the desired effects. It was possible with proper control of photoperiodism to get three or four generations a year by growing two in the greenhouse with proper artificial light and proper periods of darkness and red irradiation.

The Schwank gas burner employed as described in Example III above, will furnish the mechanism for plant response control discussed in this example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for controlling growth of vegetation comprising means for burning gas adjacent the surface of a burner element of substantial area to heat the surface of said element to a temperature at which substantial quantities of energy in the far red and infrared spectrum are emitted with the accompanying generation of gaseous products of combustion including substantial quanties of $CO_2$, means associated with said means for burning gas for periodically directing said radiant energy upon said growing vegetation to heat said vegetation and control the growth thereof, a housing structure enclosing said gas burning means and having a lower region thereof enclosed on the sides and bottom to retain heavier than air gaseous products of combustion including said $CO_2$, said vegetation being located at a substantially uniform level within said lower region whereby said gaseous products of combustion including said $CO_2$ are retained in intimate association with said growing vegetation.

2. The combination of claim 1 wherein said means for burning gas comprises a finely perforated plate of low heat conductivity ceramic with means for supplying a mixture of gas and air to one side of said plate.

3. The combination according to claim 2 wherein thermoluminescent material is coated on said plate to increase the production of radiant energy in the visible frequency spectrum.

4. The combination according to claim 1 including a radiant energy absorbing load of water within said housing structure into which a portion of said radiant energy products are directed during periods alternate with periods during which said energy is directed upon said vegetation.

5. The combination of claim 2 including means on said perforated plate for converting a portion of the radiant energy products of combustion generated by said gas-burning means into visible light.

6. The combination of claim 2 together with a coating on the opposite side of said plate to raise the surface temperature of said finely perforated plate without increasing the gas consumption of said gas-burning means, thereby enhancing infrared emission by said gas-burning means.

7. The combination of claim 3 wherein said thermoluminescent material used is capable of producing an emission in the visible spectrum of from 4,000–6,000 angstroms in frequency and an intensity at said vegetation of 1,000 foot-candles.

8. The combination of claim 3 wherein said thermoluminescent material comprises one or more materials selected from the group consisting of platinum, cerium, strontium and thorium compounds, and salts and oxides thereof.

9. The combination of claim 4 wherein said water is carried in a vessel whose outer surface is darkened to increase its radiant energy absorbing properties.

References Cited in the file of this patent

UNITED STATES PATENTS

| | | |
|---|---|---|
| 1,121,722 | Feisenden | Dec. 22, 1914 |
| 1,620,776 | Monterubis | Mar. 15, 1927 |
| 1,625,181 | Zellweger | Apr. 19, 1927 |
| 1,648,257 | Burke | Nov. 8, 1927 |
| 1,687,229 | Riedel | Oct. 9, 1928 |
| 1,954,674 | Lager | Apr. 10, 1934 |
| 2,069,292 | Walker | Feb. 2, 1937 |
| 2,775,294 | Schwank | Dec. 25, 1956 |
| 2,777,253 | Bensin | Jan. 15, 1957 |

FOREIGN PATENTS

| | | |
|---|---|---|
| 206,304 | Australia | Mar. 14, 1957 |
| 1,106,978 | France | July 27, 1955 |
| 13,607 | Great Britain | July 1, 1905 |